United States Patent
Wojtczuk et al.

(10) Patent No.: US 9,367,143 B2
(45) Date of Patent: Jun. 14, 2016

(54) SENSOR SYSTEM FOR DETECTING A MOVEMENT OF AN INFRARED LIGHT SOURCE

(71) Applicant: Pyreos Ltd., Edinburgh (GB)

(72) Inventors: Piotr Wojtczuk, Edinburgh (GB); Carsten Giebeler, Edinburgh (GB); David Binnie, Edinburgh (GB)

(73) Assignee: PYREOS LTD., Edinburgh (GB)

( * ) Notice: Subject to any disclaimer, the term of this patent is extended or adjusted under 35 U.S.C. 154(b) by 0 days.

(21) Appl. No.: 14/627,452

(22) Filed: Feb. 20, 2015

(65) Prior Publication Data

US 2015/0169086 A1 Jun. 18, 2015

Related U.S. Application Data

(63) Continuation of application No. PCT/EP2013/067153, filed on Aug. 16, 2013.

(30) Foreign Application Priority Data

Aug. 22, 2012 (DE) .......................... 10 2012 107 739

(51) Int. Cl.
*G01J 5/00* (2006.01)
*G06F 3/03* (2006.01)
(Continued)

(52) U.S. Cl.
CPC ............. *G06F 3/0325* (2013.01); *G01J 1/0266* (2013.01); *G01J 1/06* (2013.01); *G01J 5/0025* (2013.01);
(Continued)

(58) Field of Classification Search
CPC ...... G06F 3/017; G01T 7/20; G08B 13/19602
See application file for complete search history.

(56) References Cited

U.S. PATENT DOCUMENTS

| 4,912,748 A | 3/1990 | Horii et al. |
| 6,211,522 B1 * | 4/2001 | Kotlicki ................. G02B 3/005 250/353 |

(Continued)

FOREIGN PATENT DOCUMENTS

| DE | 3832428 A1 | 4/1989 |
| DE | 19548578 A1 * | 7/1997 ............ G01J 5/0022 |

(Continued)

OTHER PUBLICATIONS

Kim et al., "The gesture watch: A wireless contact-free gesture based wrist interface," 2007 11th IEEE International Symposium on Wearable Computers, pp. 15-22.*

(Continued)

*Primary Examiner* — Kiho Kim
(74) *Attorney, Agent, or Firm* — Walter Ottesen, P.A.

(57) ABSTRACT

A sensor system for detecting motion in a predefined direction of motion (30) of an infrared light source (29) has at least one pair of infrared light sensors (4, 5; 36, 37), which are arranged side by side with respect to the direction of motion (30) and, thus, define a sensor coverage zone (17) determined by the distance between distal ends (16) (with respect to the direction of motion) of the infrared light sensors. During exposure to the infrared light source, the sensors provide electrical signals, the charge signs of which are opposite each other, for detecting the motion of the infrared light source (29). The sensor system (1) has a window (7) positioned between the infrared light source (29) and the sensors such that the infrared light of the infrared light source (29) radiates onto the sensors. The sensors are arranged behind the window and are adjusted relative to the width (41) of the window to extend in the direction of motion such that, beyond a predetermined limit distance (20) away from the window, each of the sensors has a full illumination zone (22, 23), which defines the locations from which the infrared light source (29) fully illuminates only one of the sensors (4, 36 or 5, 37). The full illumination zones (22, 23) do not spatially overlap beyond the limit distance (20); and the window width (41) is smaller than the sensor coverage zone (17) in the direction of motion (30).

14 Claims, 2 Drawing Sheets

(51) Int. Cl.
*G01J 5/08* (2006.01)
*G01J 1/06* (2006.01)
*G01J 5/34* (2006.01)
*G01J 1/02* (2006.01)
*G01S 17/66* (2006.01)

(52) U.S. Cl.
CPC ............... *G01J 5/089* (2013.01); *G01J 5/0831* (2013.01); *G01J 5/0875* (2013.01); *G01J 5/34* (2013.01); *G01S 17/66* (2013.01)

(56) References Cited

U.S. PATENT DOCUMENTS

| | | | |
|---|---|---|---|
| 6,528,788 B1 * | 3/2003 | Galloway | G08B 13/191 250/332 |
| 2003/0197114 A1 | 10/2003 | Muesch et al. | |
| 2004/0129883 A1 * | 7/2004 | Dougherty | G08B 13/191 250/338.3 |
| 2005/0184869 A1 * | 8/2005 | Micko | G08B 13/19 340/567 |
| 2005/0263705 A1 * | 12/2005 | Asatani | F24C 5/16 250/341.1 |
| 2007/0018106 A1 * | 1/2007 | Zhevelev | G01J 5/08 250/353 |
| 2009/0302220 A1 | 12/2009 | Micko | |
| 2010/0019903 A1 * | 1/2010 | Sawaya | G01J 5/0022 340/552 |
| 2012/0200486 A1 | 8/2012 | Meinel et al. | |
| 2013/0037700 A1 | 2/2013 | Michiyama et al. | |

FOREIGN PATENT DOCUMENTS

| | | | |
|---|---|---|---|
| DE | 1357393 A1 * | 10/2003 | ............ G01S 3/7835 |
| EP | 1357393 A1 | 10/2003 | |
| EP | 2463751 A2 | 6/2012 | |
| WO | 2012032753 A1 | 3/2012 | |

OTHER PUBLICATIONS

International Search Report in counterpart International Application No. PCT/EP2013/067153, mailed Nov. 7, 2013.

* cited by examiner

SENSOR SYSTEM FOR DETECTING A MOVEMENT OF AN INFRARED LIGHT SOURCE

CROSS-REFERENCE TO RELATED APPLICATIONS

This is a Continuation of International Application PCT/EP2013/067153, which has an international filing date of Aug. 16, 2013, and the disclosure of which is incorporated in its entirety into the present Continuation by reference. The following disclosure is also based on and claims the benefit of and priority under 35 U.S.C. §119(a) to German Patent Application No. DE 10 2012 107 739.8, filed Aug. 22, 2012, which is also incorporated in its entirety into the present Continuation by reference.

FIELD OF AND BACKGROUND OF THE INVENTION

The invention relates to a sensor system for detecting a motion of an infrared light source.

Interactive systems and their human-machine interfaces, which are equipped with a device for automatic recognition of gestures performed by humans, are known for human-computer interaction. As a general principle, the gesture can be derived from any posture and any motion of the human body. In this case hand gestures are the most important. The gesture recognition system is equipped with a device for visual detection, in particular, of the gesticulating hand, so that the image data, which are generated by this method, are evaluated by means of corresponding algorithms, in order to derive a gesture from the image data. The device for visual detection has typically been a camera, which has the drawback that it occupies a large installation space and has high investment costs. For this reason it is not possible to produce camera-based gesture recognition systems in a miniaturized design at a low cost, which would be advantageous, for example, for use in mobile phones. Furthermore, camera-based systems have the drawback that they have a high energy consumption, so that mobile applications are difficult to implement. As an alternative, high-speed spectrometers are well-known. However, they do not provide an alternative in terms of a miniaturized design at a low cost. Furthermore, sensor-based systems are known. However, with respect to their limited accuracy of resolution such sensor-based systems allow only an unsatisfactory quality of the gesture recognition; and with respect to their high energy consumption they are suitable for mobile applications only to a limited extent.

SUMMARY

An object of the present invention is to provide a sensor system for detecting a motion. In this case the sensor system should have a small space requirement, a high accuracy of resolution for gesture recognition, a low power consumption and a low cost.

The inventive sensor system for detecting a motion in a predefined direction of motion of an infrared light source has at least one pair of infrared light sensors, said pair consisting of two infrared light sensors, which are arranged side by side with respect to the direction of motion and, thus, define a sensor coverage zone, which is determined by the distance between the ends of the infrared light sensors that face away from each other, with respect to the direction of motion. The infrared light sensors are configured in such a way that during exposure to the infrared light source, said sensors provide electrical signals, the charge signs of which are opposite one another, for detecting the motion of the infrared light source in such a way that said signals can be tapped off. The sensor system additionally has a window between the infrared light sensors and the infrared light source; and through this window the infrared light of the infrared light source radiates onto the infrared light sensors; and behind this window the infrared light sensors are arranged; and their arrangement and their extent in the direction of motion are adjusted to the width of the window in such a way that beyond a predetermined limit distance away from the window, each of the infrared light sensors has a full illumination zone, which defines the locations, from which the infrared light source fully illuminates only one of the infrared light sensors, wherein the full illumination zones do not spatially overlap beyond the limit distance (the limit of the zone of exposure), and the width of the window is smaller than the sensor coverage zone in the direction of motion.

It is preferred that the sensor coverage zone projects beyond the window on both sides and the same length. Furthermore, the infrared light sensors are preferably configured in such a way that when said sensors are exposed to the infrared light source with the same intensity, the signals are equally strong. The infrared light sensors are preferably of a pyroelectric nature, are usually made preferably of lead zirconate titanate and are preferably inversely polarized. Preferably the infrared light sensors are manufactured in a thin film design by means of a sputtering process.

Each of the infrared light sensors has preferably a signal line, with which the electrical signals of the infrared light sensors can be tapped off, where in this case the signal lines are connected to a signal bus line of the sensor system. Furthermore, it is preferred that the width of the window in the direction of motion is between 0.7 and 1 times the sensor coverage zone, in particular, between 0.8 and 0.9.

Moreover, it is also preferred that with respect to the extent of the window an outer edge of the sensor and an inner edge of the sensor are defined by each infrared light sensor, and a first window edge, which is immediately adjacent to the inner edge of the sensor, and a second window edge, which is immediately adjacent to the outer edge of the sensor, are defined by the window. In this case the straight line from the inner edge of the sensor to the first edge of the window and the sensor normal enclose a first angle; and the sensor normal and the straight line from the outer edge of the sensor to the second edge of the window enclose a third angle, so that the difference between the absolute value of the first angle and the absolute value of the third angle is greater than twice the absolute value of the third angle, in particular, between two times and four times the absolute value of the third angle.

In addition or as an alternative, it is preferred that with respect to the extent of the window an outer edge of the sensor and an inner edge of the sensor are defined by each infrared light sensor; and a first window edge, which is immediately adjacent to the inner edge of the sensor, and a second window edge, which is immediately adjacent to the outer edge of the sensor, are defined by the window. In this case the straight line from the inner edge of the sensor to the second edge of the window and the sensor normal enclose a second angle; and the sensor normal and the straight line from the outer edge of the sensor to the second edge of the window enclose a third angle, so that the absolute value of the third angle is between zero and the absolute value of the second angle, in particular, so that the absolute value of the third angle is between zero and 0.5 of the absolute value of the second angle.

Preferably the sensor system has two pairs of infrared light sensors, each pair consisting of two of the infrared light sensors; and the window is rectangular, downstream of which the infrared light sensors are arranged as an array symmetrical to the window, wherein the infrared light sensors of the one pair of infrared light sensors are arranged on the one diagonal line of the window, and the infrared light sensors of the other pair of infrared light sensors are arranged on the other diagonal line of the window, so that either the one diagonal line or the other diagonal line defines the direction of motion.

Furthermore, it is preferable that the infrared light sensors and the window are configured in such a way that, when the infrared light source is a human hand, the infrared light sensors provide, upon exposure to the hand, electrical signals for detecting the motion of the hand in such a way that said signals can be tapped off.

If each of the infrared light sensors is exposed to infrared light from the infrared light source, then the electrical signals, which can be tapped off at the infrared light sensors, have opposite charge signs. This feature is achieved preferably by the fact that the infrared light sensors have a pyroelectric characteristic (they comprise lead zirconate titanate) and are inversely polarized. When the infrared light source is moved in the direction of motion past the infrared light sensors, it is provided that the motion takes place beyond the limit of the zone of exposure. The window is arranged between the locations, where the infrared light source is located, and the infrared light sensors, where in this case the region away from the window up to the limit of the zone of exposure is characterized in that the full illumination zones of the infrared light sensors overlap. The sensor coverage zone, the width of the window, the distance between the window and the infrared light sensors as well as the limit of the zone of exposure are adjusted to each other in such a way that the motion of the infrared light source past the sensor system can be effected in an application that is useful for the sensor system. Since the motion of the infrared light source is effected beyond the limit of the zone of exposure, the object is satisfied at least in the case of the infrared light source having a point extent that, depending on which of the full illumination zones the infrared light source is located in, the signal is provided in such a way that it can be tapped off at either the one infrared light sensor or the other infrared light sensor.

When moving past the infrared light source in the direction of motion and beyond the limit of the zone of exposure, the infrared light source dips first into the full illumination zone of the forward infrared light sensor. After the infrared light source has passed through this full illumination zone, the infrared light source moves out of this full illumination zone. If the infrared light source is located exactly in the limit distant away from the window, then the infrared light source dips immediately into the full illumination zone of the rearward infrared light sensor, so that the respective boundaries of the full illumination zones intersect at the limit of the zone of exposure. This intersecting point is symmetrical in the limit distance away from the window and over the infrared light sensors. The full illumination zones beyond the limit of the zone of exposure do not overlap spatially, and the width of the window in the direction of motion is smaller than the sensor coverage zone. If the motion of the infrared light source takes place beyond the limit of the zone of exposure, then the infrared light source, having left the full illumination zone of the forward infrared light sensor, does not dip immediately into the full illumination zone of the rearward infrared light sensor and may be found in an intermediate region, into which neither the full illumination zone of the rearward infrared light sensor nor the full illumination zone of the forward infrared light sensor extends. Having passed through this intermediate region, the infrared light source plunges into the full illumination zone of the rearward infrared light sensor and is moved further in the latter, until it emerges from this full illumination zone. Thus, the infrared light source passes through both full illumination zones, so that the infrared light source is located in neither one of the full illumination zones or is arranged in only one of the full illumination zones. This approach satisfies the object that the difference between the electrical signals, which are provided in such a way that they can be tapped off at the infrared light sensors, is large, so that the signal-to-noise ratio of the sensor system is large. As a result, the sensor system has a high sensitivity. Hence, the sensor system makes it possible to detect in a reliable manner the motion of the infrared light source with an analysis of the electrical signals.

Furthermore, the sensor system has advantageously a low power consumption, which may be in the microwatt range. As a result, the sensor system lends itself well to use in mobile applications, because there is no need to provide the power supply of the sensor system with large, heavy and expensive units. One advantage of the preferred array arrangement of the two pairs of infrared light sensors is that the sensor system can be operated with a power consumption in the microwatt range.

BRIEF DESCRIPTION OF THE DRAWINGS

A preferred embodiment of the sensor system according to the invention is explained below with reference to the accompanying schematic drawings. The drawings show in.

DETAILED DESCRIPTION OF THE DRAWINGS

Figure 1:
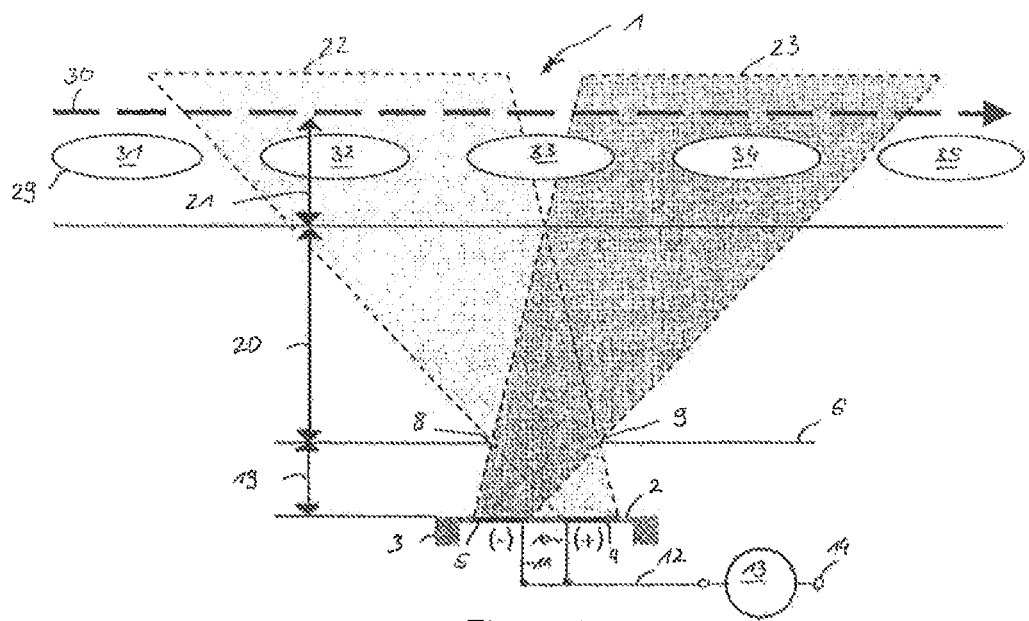
FIG. 1 in schematic form a cross sectional view of the sensor system.

It is apparent from the figures that a sensor system 1 has a membrane 2 and a frame 3. The frame 3 defines the membrane 2, which is spanned by the frame 3 and is provided as a substrate for a first infrared light sensor 4 and a second infrared light sensor 5.

The infrared light sensors 4, 5 are made of lead zirconate titanate and inversely polarized, so that when the infrared light sensors 4, 5 are exposed to infrared light, the electrical signals with different charge signs can be picked off from said infrared light sensors. The polarization of the first infrared light sensor 4 is denoted by (+); and the polarization of the second infrared light sensor 5 is denoted by (−). The infrared light sensors 4, 5 are designed in such a way that, when they are exposed to infrared light of the same intensity and frequency, they have the same signal strength.

A cover 6, which has a window 7, is disposed on that side of the infrared light sensors 4, 5, from which the exposure of the infrared light sensors 4, 5 is provided. The window 7 is defined by a first window edge 8 on the left hand side and by a second window edge 9 on the right hand side in FIGS. 1 and 2.

In order to tap off the electrical signals of the infrared light sensors 4, 5, a first signal line 10 is connected in an electrically conductive manner to the first infrared light sensor 4; and a second signal line 11 is connected in an electrically conductive manner to the second infrared light sensor 5. In this case the signal lines 10, 11 are combined to form a signal bus line 12. As a result, the signals of the infrared light sensors 4, 5 can be tapped off as a sum signal at the signal bus line 12.

A signal conditioning unit 13, to which the sum signal is fed, is connected to the signal bus line 12. For output purposes a signal output 14 is provided on the signal conditioning unit 13.

The infrared light sensors 4, 5 are disposed on the membrane 2 in such a way that they are spaced apart from each other. In this case a sensor inner edge 15 is defined at the sides of the infrared light sensors 4, 5 that face away from each other. A sensor outer edge 16 is defined at the edge of the infrared light sensors 4, 5 that faces away from the sensor inner edge 15. The distance between the sensor outer edges 16 of the infrared light sensors 4, 5 is referred to as a sensor coverage zone 17. Centrally between the sensor inner edges 15 and perpendicular to the membrane 2 there is an axis of symmetry 18.

The window 7 extends parallel to the membrane 2 and is arranged at a distance from the infrared light sensors 4, 5; and said distance is referred to as a window distance 19. Beyond the window distance 19 away from the infrared light sensors 4, 5 a limit distance 20 (a limit of the zone of exposure) is defined; and this limit distance constitutes the starting point of a motion of an infrared light source 29, where in this case the motion is to be detected by the sensor system 1. The motion of the infrared light source 29 is defined by a motion distance 21, which denotes the distance between the infrared light source 29 and the limit distance 20, and a direction of motion 30, which extends along the sensor coverage zone 17.

The position and orientation of the first window edge 8, the second window edge 9 and the sensor inner edges 15 and the sensor outer edges 16 generate a first full illumination zone 22 for the first infrared light sensor 4 and a second full illumination zone 23 for the second infrared light sensor 5. The full illumination zones 22, 23 are defined by all conceivable locations of point-shaped infrared light sources, from which the infrared light sensors 4, 5 are to be fully illuminated by the infrared light sources. That is, if the point-shaped infrared light source is located in the first full illumination zone 22, then the first infrared light sensor 4 is always fully illuminated by said point-shaped first infrared light source; and the second infrared light sensor 5 is not illuminated or is not fully illuminated by said point-shaped first infrared light source. In an analogous manner the second infrared light sensor 6 is fully illuminated by the infrared light sources; and the first infrared light sensor 4 is not illuminated or is not fully illuminated, when the infrared light sources are located in the second full illumination zone 23. A partial illumination zone 24 is located with respect to the first infrared light sensor 4 outside the first full illumination zone 22; and a partial illumination zone is located with respect to the second infrared light sensor 5 outside the second full illumination zone 23. If the infrared light source is located in one of the partial illumination zones, then the associated infrared light sensor 5, 6 is not fully illuminated.

A sensor normal 25 is perpendicular to the surface of the infrared light sensors 4, 5 that faces the window 7. Angles for the first infrared light sensor 4 are defined in the following. A first angle 26 is enclosed between the sensor normal 25 on the sensor inner edge 15 and the straight line between the first window edge 8 and the sensor inner edge 15. A second angle 27 is enclosed from the sensor normal 25 on the sensor inner edge 15 to the straight line between the sensor inner edge 15 and the second window edge 9. A third angle 28 is enclosed between the sensor normal 25 on the sensor outer edge 16 and the straight line between the sensor outer edge 16 and the second window edge 9. The definitions for the angles 26 to 28 also apply in an analogous manner to the second infrared light sensor 5. Since the infrared light sensors 4, 5 are provided in the direction of motion 30 in such a way that they have the same width and since the window 7 is arranged so as to be symmetrical about the axis of symmetry 18, the angles 26 to 28 of the first infrared light sensor 4 are the same size as the corresponding angles 26 to 28 of the second infrared light sensor 5.

The sensor system 1 is configured to identify a motion of the infrared light source 29 in the motion distance 21 and in the direction of motion 30 by means of the infrared light sensors 4, 5 and the signal conditioning unit 13. In the course of the motion of the infrared light source 29, it is moved out of a first position 31 into a second position 32, into a third position 33, into a fourth position 34 to a fifth position 35. The first position 31 is located outside the first full illumination zone 22. The second position 32 is located completely inside the first full illumination zone 22. The third position 33 is located on the axis of symmetry 18, so that its center is arranged between the first full illumination zone 22 and the second full illumination zone 23. The fourth position 34 is located completely inside the second full illumination zone 23. The fifth position 35 is located completely outside the second full illumination zone 23. When the first infrared light source 29 moves from the first position 31 to the second position 32, the infrared light source 29 enters the first full illumination zone 22; and, upon changing the second position 32 for the third position 33, said infrared light source emerges from the first full illumination zone 22. In the course of moving from the third position 33 to the fourth position 34, the infrared light source 29 dips into the second full illumination zone 23; and, upon changing the fourth position for the fifth position 35, said infrared light source emerges from the second full illumination zone 23. In the first position 31 neither the first infrared light sensor 4 nor the second infrared light sensor 5 is fully illuminated by the infrared light source 29, because the infrared light source 29 is not located in either the first full illumination zone 22 nor in the second full illumination zone 23. In the second position 32 the first infrared light sensor 4 is fully illuminated; and, thus, the second infrared light sensor 5 is not fully illuminated.

Owing to the spatial extent of the infrared light source 29 in the direction of motion 30, the infrared light source 29 in the third position 33 extends not only inside the first full illumination zone 22 but also inside the second full illumination zone 23. As a result, both the first infrared light sensor 4 and the second infrared light sensor 5 are slightly illuminated. If the infrared light source 29 is configured in its spatial extent so as to be small and/or the motion distance 21 is chosen sufficiently large that the infrared light source 29 in the third position 33 is completely between the full illumination zones 22, 23, then neither one of the full illumination zones 22, 23 is fully illuminated by the infrared light source 29.

The sensor system 1 for detecting the motion in the direction of motion 30 of the infrared light source 29 in the motion distance 21 has a high signal-to-noise ratio. This feature is achieved in that the sensor system 1 exhibits, in particular, the following geometric characteristics. The width 41 of the window is between 0.8 and 0.9 times the sensor coverage zone. The difference between the absolute value of the first angle 26 and the absolute value of the third angle 28 is greater than twice the absolute value of the third angle 28. The absolute value of the third angle 28 is less than the absolute value of the second angle 27. The selected absolute values of the angles 26 to 28 and the distances 19 to 21 are a function of the size and type of the infrared light source 29. The infrared light source 29 is, for example, a human hand. In particular, the absolute value of the third angle 28 and the limit distance 20 as well as the motion distance 21 are adjusted to each other in such a way that the sensor system 1 has the maximum possible signal-to-noise ratio with respect to the dimensions of the hand, the energy of the infrared light emission of the hand, and the sensitivity of the infrared light sensors 4 and 5. This goal is achieved, in particular, by the fact that in the third position 33 the hand exhibits the smallest possible simultaneous overlap with the first full illumination zone 22 and the second full illumination zone 23. In addition, the window width 17 and the orientation of the window edges 8, 9 are adapted to the window distance 19 and the sensor coverage zone 17 in such a way that practical considerations during the installation of the sensor system 1 in an application device are met. For example, the window distance 19 could be reduced with a corresponding reduction of the window width 17 without any change in the position and orientation of the full illumination zones 22, 23.

When the hand moves from the first position 31 to the fifth position 35 via the positions 32 to 34, the signal bus line 12 generates a sinusoidal signal that has initially a negative amplitude and then a positive amplitude. The signal conditioning unit 13 is configured in such a way that it detects the movement in the direction of motion from the signal and identifies the direction of motion 30. If the hand moves in a direction opposite the direction of motion 30, then the sinusoidal signal in the signal bus line 12 has initially a positive amplitude and then a negative amplitude. In this case the signal conditioning unit 13 is configured to detect a motion in a direction opposite the direction of motion 13 and to identify the direction of motion.

Within the limit distance 20 there is an overlap of the full illumination zones 22, 23. If, for example, the infrared light source 29 is inside this overlap zone, then the first infrared light sensor 4 and the second infrared light sensor 5 are illuminated. As a result, the first infrared light sensor 4 generates the signal with the negative charge sign, and at the same time the second infrared light sensor 5 generates the signal with the positive charge sign. Since the signal lines 10, 11 are combined to form the signal bus line 12 and since the signals of the infrared light sensors 4, 5 are present as a sum signal, the signals of the infrared light sensors 4, 5 cancel each other on account of their opposite charge signs. As a result, the sensor system 1 is also capable of satisfying the objective of a high signal-to-noise ratio, when the motion of the infrared light source 29 is within the limit distance 20.

Figure 2:
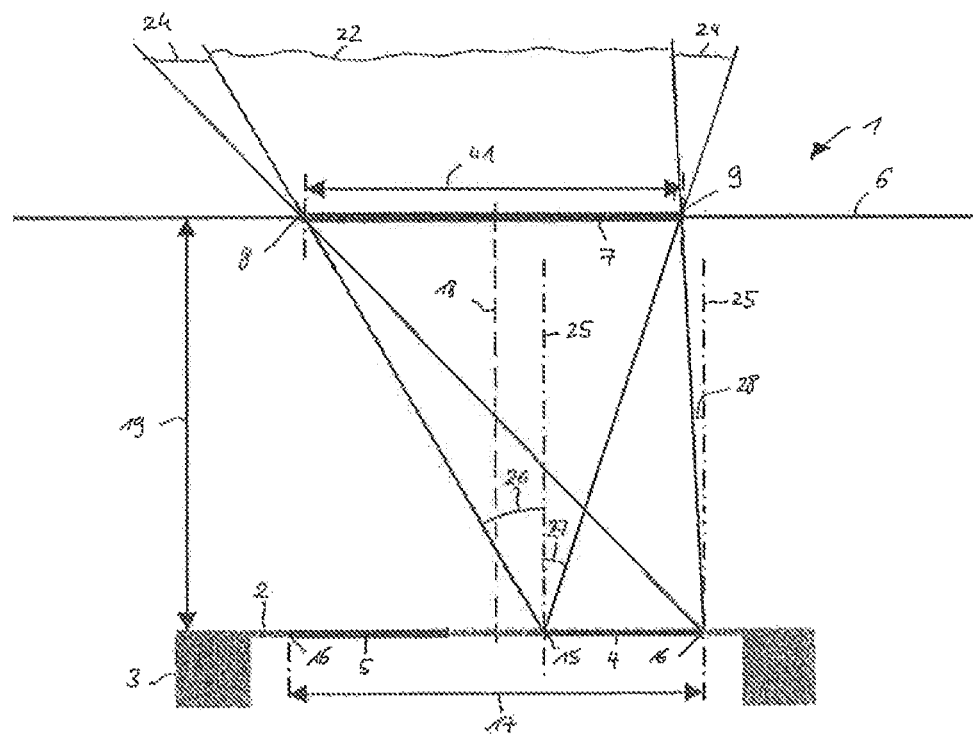
FIG. 2 a detailed view from FIG. 1.

FIGS. 1 and 2 show the sensor system 1 with its two infrared light sensors 4, 5 that detect a single spatial dimension of the motion of the infrared light source 29. The sensor system 1 as a one dimensional embodiment would also be conceivable.

Figure 3:
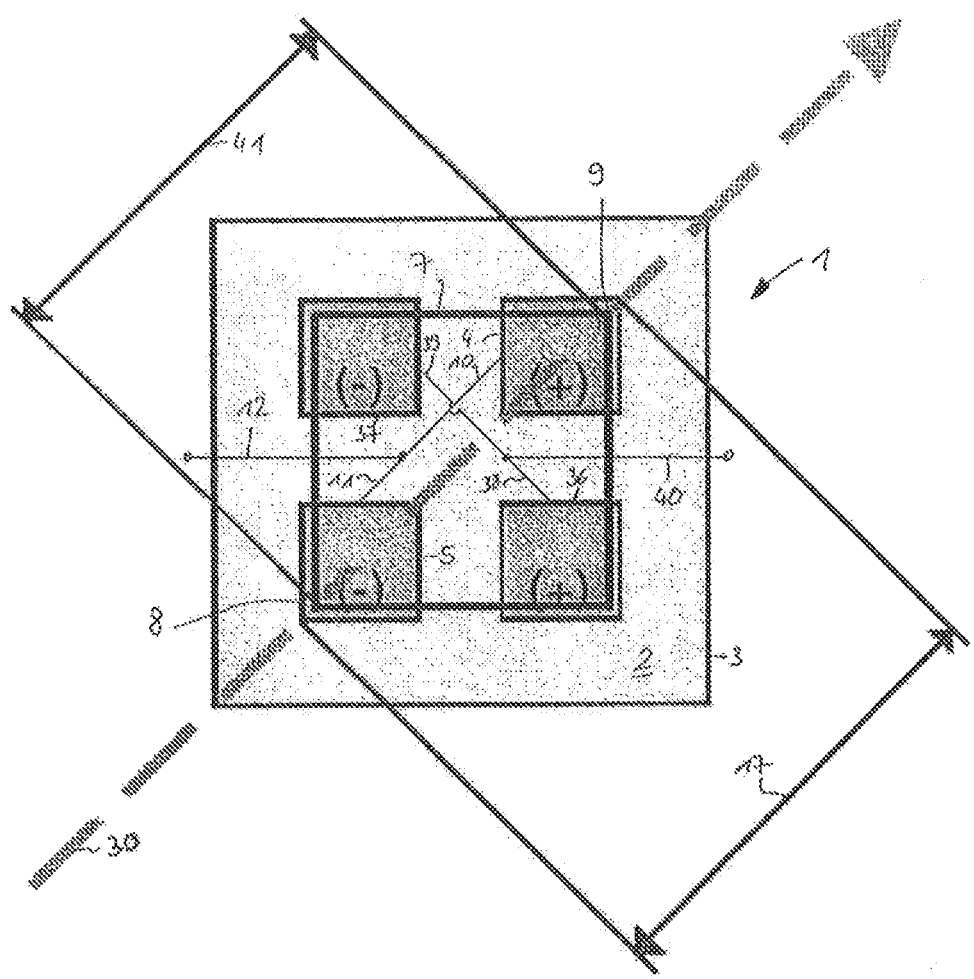
FIG. 3 a plan view of the sensor system.

Furthermore, according to FIG. 3, the sensor system 1 also comprises a third infrared light sensor 36 and a fourth infrared light sensor 37, where in this case the infrared light sensors 36, 37 are disposed on the membrane 2 in such a way that they are oriented perpendicular to the direction of motion 30. The infrared light sensors 4, 5 and 36, 37 form an array, and constitute a two dimensional embodiment. Thus, the sensor coverage zone 17 for the infrared light sensors 4, 5 is formed by the diagonal of the array, on which the infrared light sensors 4, 5 are located. A sensor coverage zone is defined in an analogous manner for the infrared light sensors 36, 37. The window 7 is designed rectangular, so that in the plan view the array extends over the window edges 8, 9. As a result, the window width 17 is smaller than the sensor coverage zones.

Each of the infrared light sensors 36, 37 has a signal line 38, 39; and these two signal lines are combined to form a second signal bus line 40. The sensors 36, 37 are dimensioned and configured in a manner analogous to that of the infrared light sensors 4, 5, so that when the infrared light source 29 moves in the motion distance 21 perpendicular to the direction of motion 30, a corresponding electrical signal is applied to the second signal bus line 40.

Therefore, the sensor system 1 in the array arrangement of the infrared light sensors 4, 5 and 36, 37 allows a two dimensional motion of the infrared light source 29 in the motion distance 21 by means of the signals that are present in the signal bus lines 12, 40 and that can be evaluated by the signal conditioning unit 13. The signal conditioning unit 13 is configured to detect the direction of motion of the infrared light source 29 by means of the signals occurring in the signal bus lines 12, 40. If, for example, the motion is parallel to the direction of motion 30, as shown in FIG. 3, then the first signal line 12 has a sinusoidal signal that has initially a negative amplitude and then a positive amplitude. There is no signal at the second signal bus line 40, because the signals, which may be generated by the infrared light sensors 36, 37, cancel each other in the second signal bus line 40. In an analogous manner every conceivable motion of the infrared light source 29 can be detected by the sensor system 1, if the signals in the signal bus lines 12, 40 are suitably combined. If the infrared light source 29 is the hand, and if the motion is a hand gesture or a part of a gesture, then the gesture can be detected by the sensor system 1.

List of Reference Numerals
1 sensor system
2 membrane
3 frame
4 first infrared light sensor
5 second infrared light sensor
6 cover
7 window
8 first edge of the window
9 second edge of the window
10 first signal line
11 second signal line
12 signal bus line
13 signal conditioning unit
14 signal output
15 inner edge of the sensor
16 outer edge of the sensor
17 sensor coverage zone
18 axis of symmetry
19 window distance
20 limit distance (limit of the zone of exposure)
21 motion distance
22 first full illumination zone
23 second full illumination zone
24 partial illumination zone
25 sensor normal
26 first angle
27 second angle
28 third angle
29 infrared light source
30 direction of motion
31 first position
32 second position
33 third position
34 fourth position
35 fifth position
36 third infrared light sensor
37 fourth infrared light sensor
38 third signal line
39 fourth signal line
40 second signal bus line
41 window width

What is claimed is:

1. Sensor system for detecting a motion in a predefined direction of motion of an infrared light source, said sensor system comprising:
   at least one pair of infrared light sensors, said pair consisting of two infrared light sensors arranged side by side with respect to the direction of motion and thereby defining a sensor coverage zone determined by the distance between mutually distal ends of the infrared light sensors with respect to the direction of motion,
   wherein the infrared light sensors are configured to provide electrical signals having mutually opposite charge signs in response to exposure to infrared light from the infrared light source, for detecting the motion of the infrared light source, and
   a window between the infrared light source and the infrared light sensors,
   wherein the window is configured to pass the infrared light of the infrared light source onto the pair of infrared light sensors,
   wherein the pair of infrared light sensors is arranged at a predefined distance from the window and extends in the direction of motion such that the distance, a position of the pair of infrared light sensors relative to the window and a width of the window define a predetermined limit distance away from the window, at which each of the pair of the infrared light sensors has a respective full illumination zone which defines respective locations of the infrared light source from which the infrared light source fully illuminates only one of the infrared light sensors, and
   wherein the full illumination zones do not spatially overlap beyond the limit distance, and the width of the window is smaller than the sensor coverage zone in the direction of motion.

2. The sensor system as claimed in claim 1, wherein, in the direction of motion, the sensor coverage zone projects beyond the window on both sides of the window and to an equal extent.

3. The sensor system as claimed in claim 1, wherein the infrared light sensors are configured such that, upon exposure to the infrared light source with equal intensity, the electrical signals are equally strong.

4. The sensor system as claimed in claim 1, wherein the infrared light sensors are pyroelectric sensors.

5. The sensor system as claimed in claim 4, wherein the infrared light sensors comprise lead zirconate titanate and are inversely polarized.

6. The sensor system as claimed in claim 1, wherein each of the infrared light sensors has a signal line, with which the electrical signals of the infrared light sensors are tapped off, and wherein the signal lines are connected to a signal bus line of the sensor system.

7. The sensor system claimed in claim 1, wherein the width of the window in the direction of motion is between 0.7 and 1 times the sensor coverage zone.

8. The sensor system as claimed in claim 7, wherein the window width in the direction of motion is between 0.8 and 0.9 times the coverage zone.

9. The sensor system as claimed in claim 1, wherein, with respect to the extent of the window, each infrared light sensor defines a sensor outer edge and a sensor inner edge, wherein a first window edge, which is immediately adjacent to the sensor inner edge, and a second window edge, which is immediately adjacent to the sensor outer edge, are defined by the window, wherein a straight line from the sensor inner edge to the first window edge and a sensor normal enclose a first angle, and wherein the sensor normal and a straight line from the sensor outer edge to the second window edge enclose a third angle, wherein the difference between an absolute value of the first angle and an absolute value of the third angle is greater than twice the absolute value of the third angle.

10. The sensor system as claimed in claim 9, wherein the difference between the absolute value of the first angle and the absolute value of the third angle is between two times and four times the absolute value of the third angle.

11. The sensor system as claimed in claim 1, wherein with respect to the extent of the window, each infrared light sensor defines a sensor outer edge and a sensor inner edge, wherein a first window edge, which is immediately adjacent to the sensor inner edge, and a second window edge, which is immediately adjacent to the sensor outer edge, are defined by the window, wherein a straight line from the sensor inner edge to the second window edge and a sensor normal enclose a second angle, and wherein the sensor normal and a straight line from the sensor outer edge to the second window edge enclose a third angle, wherein an absolute value of the third angle is between zero and an absolute value of the second angle.

12. The sensor system as claimed in claim 11, wherein the absolute value of the third angle is between zero and 0.5 of the absolute value of the second angle.

13. The sensor system as claimed in claim 1, wherein the sensor system comprises a second pair of infrared light sensors, the second pair consisting of two of the infrared light sensors, wherein the window is rectangular, and downstream of which the infrared light sensors are arranged as an array symmetrical to the window, wherein the infrared light sensors of the one pair of infrared light sensors are arranged on one diagonal line of the window, and the infrared light sensors of the second pair of infrared light sensors are arranged on an other diagonal line of the window, so that either the one diagonal line or the other diagonal line defines the direction of motion.

14. The sensor system as claimed in claim 1, wherein the infrared light sensors and the window are configured such that, when the infrared light source is a human hand, the infrared light sensors provide, upon exposure to the hand, electrical signals for detecting the motion of the hand.

* * * * *